(12) United States Patent
Graves et al.

(10) Patent No.: US 7,030,349 B1
(45) Date of Patent: Apr. 18, 2006

(54) COMBINATION OVEN ILLUMINATION IN MICROWAVE ONLY COOKING MODE

(75) Inventors: Todd Vincent Graves, Louisville, KY (US); Dennis Patrick Kill, Louisville, KY (US); Jesse Spalding Head, Louisville, KY (US); Charles Ray Smith, Shelbyville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/481,065

(22) Filed: Jan. 11, 2000

Related U.S. Application Data

(60) Provisional application No. 60/115,744, filed on Jan. 13, 1999.

(51) Int. Cl.
*H05B 6/68* (2006.01)
(52) U.S. Cl. ............. 219/758; 219/685; 219/702; 362/92
(58) Field of Classification Search ........... 219/758, 219/681–685, 720, 702, 506; 362/92
See application file for complete search history.

(56) References Cited

U.S. PATENT DOCUMENTS

| | | | |
|---|---|---|---|
| 4,238,995 A | 12/1980 | Polster | |
| 4,332,992 A * | 6/1982 | Larsen et al. | 219/681 |
| 4,396,817 A | 8/1983 | Eck et al. | |
| 5,097,112 A * | 3/1992 | Kanaya et al. | 219/411 |
| 5,317,130 A | 5/1994 | Burkett et al. | |
| 5,352,865 A | 10/1994 | Burkett et al. | |
| 5,528,018 A | 6/1996 | Burkett et al. | |
| 5,596,514 A | 1/1997 | Maher, Jr. et al. | |
| 5,695,669 A | 12/1997 | Westerberg | |
| 5,726,426 A | 3/1998 | Davis et al. | |
| 5,747,783 A * | 5/1998 | Myung et al. | 219/758 |
| 5,883,362 A | 3/1999 | Pettibone et al. | |
| RE367,247 | 6/2000 | Westerberg et al. | |
| 6,333,492 B1 | 12/2001 | Graves et al. | |

FOREIGN PATENT DOCUMENTS

| | | | | |
|---|---|---|---|---|
| JP | 3-168522 | * | 7/1991 | 219/758 |
| JP | 5-52348 | * | 3/1993 | 219/758 |

* cited by examiner

*Primary Examiner*—Philip H. Leung
(74) *Attorney, Agent, or Firm*—H. Neil Houser, Esq.; Armstrong Teasdale LLP

(57) ABSTRACT

A combination oven includes radiant cooking lamps and a magnetron for delivering cooking energy to a cooking cavity. The oven is operable in a speed cooking mode utilizing both radiant and microwave energy, a microwave only cooking mode utilizing only microwave energy, and a radiant only cooking mode utilizing only radiant energy. A radiant cooking element is briefly energized upon user command during microwave only cooking modes and lower power radiant cooking modes to illuminate the cooking cavity for visualization of cooking in progress. A duration of cavity illumination is limited to prevent cooking of food during cavity illumination.

20 Claims, 14 Drawing Sheets

--- FIG. 8A

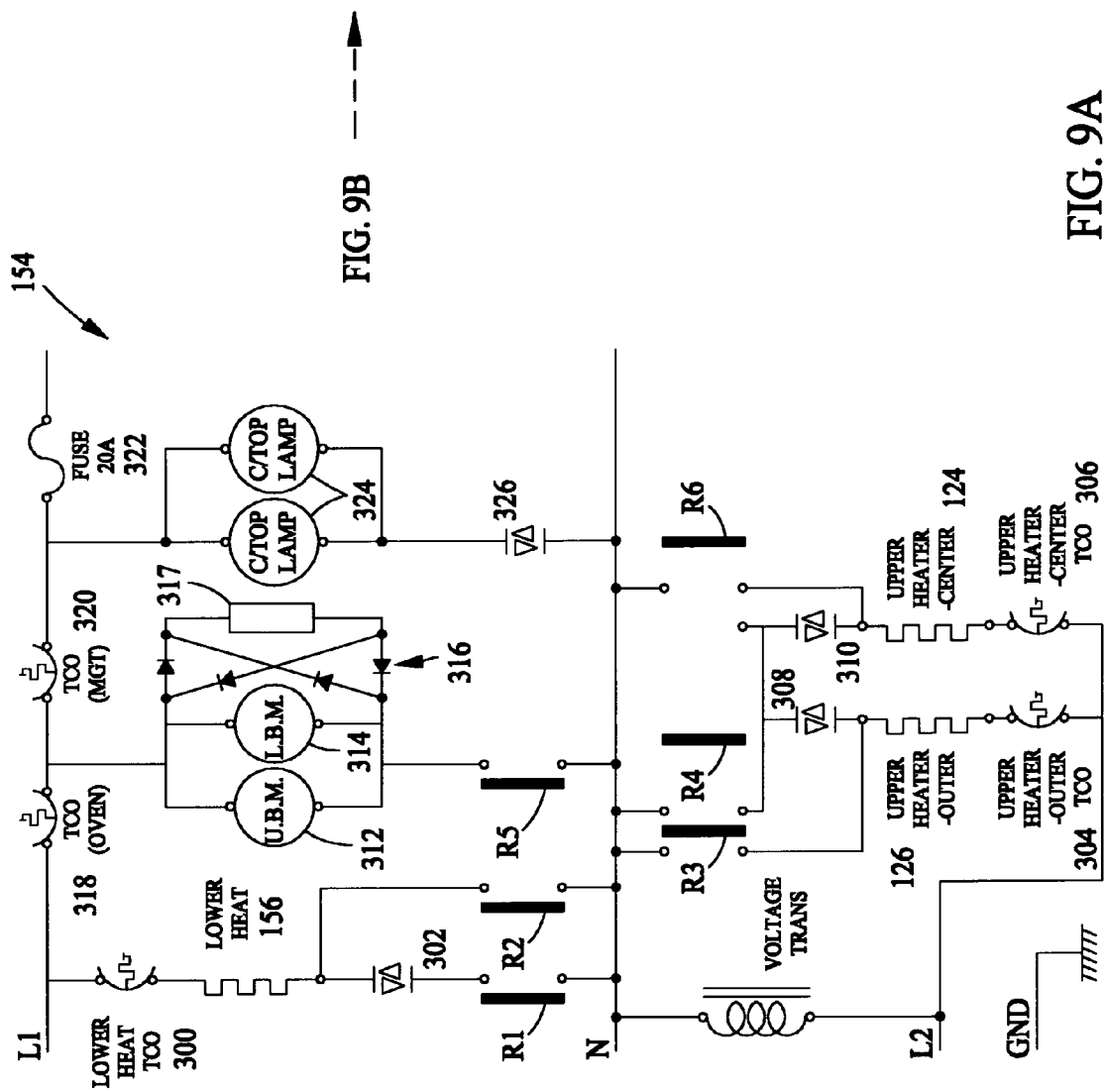

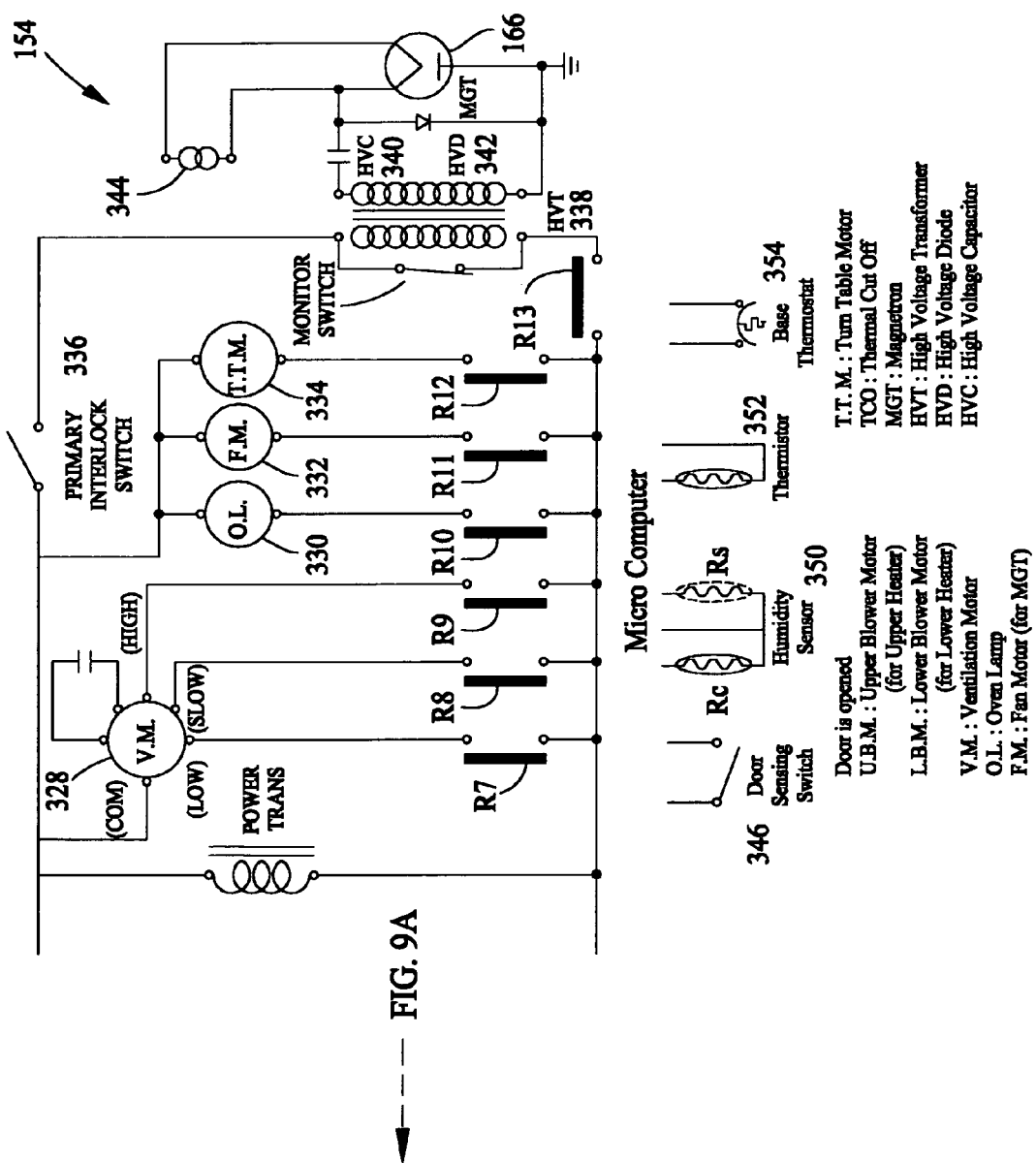

SELECT UPPER POWER :
5:00   U=07   L=05   M=02

SELECT

SELECT LOWER POWER :
5:00   U=07   L=05   M=02

SELECT

SELECT MICRO POWER :
5:00   U=08   L=05   M=03

SELECT

ADJUST TIME or START
5:00

COMBINATION OVEN ILLUMINATION IN MICROWAVE ONLY COOKING MODE

CROSS REFERENCE TO RELATED APPLICATIONS

This application claims the benefit of U.S. provisional application No. 60/115,744, filed Jan. 13, 1999.

BACKGROUND OF THE INVENTION

This invention relates generally to ovens and, more particularly, to a combination oven using both radiant and microwave energy.

Known ovens are either, for example, microwave or radiant cooking type ovens. For example, a microwave oven includes a magnetron for generating RF energy used to cook food in the oven cooking cavity. Although microwave ovens cook food more quickly than radiant ovens, microwave ovens do not brown the food. Microwave ovens therefore typically are not used to cook as wide a variety of foods as radiant ovens.

Radiant cooking ovens include an energy source such as lamps which generate light energy used to cook the food. Radiant ovens brown the food and generally can be used to cook a wide variety of foods. Radiant ovens, however, cook foods slower than microwave ovens. It would be desirable to provide an oven which provides the speed advantages of microwave ovens yet also can be used to cook a wide variety of foods such as with radiant ovens.

BRIEF SUMMARY OF THE INVENTION

In an exemplary embodiment of the invention, an oven includes both radiant cooking elements and a magnetron, or microwave, cooking element. The cooking elements are controlled to provide reduced cooking time as compared to known radiant ovens, yet a wide variety of foods can be cooked in the oven. The oven is operable in a speed cooking mode wherein both radiant and microwave cooking elements are utilized, in a microwave only cooking mode wherein only the magnetron is utilized for cooking, and a radiant only cooking mode wherein only the lamps are utilized for cooking.

Since radiant lamps are used for radiant cooking, the oven door has a dark glass window, such as a dark tinted glass window, to protect users from intense light generated by the radiant lamps. Consequently, the window does not enable visualization of the cooking cavity with conventional oven lighting during a microwave only mode of the oven and during radiant cooking operations in which the lamps are not sufficiently energized to enable visualization of food in the cooking cavity through the window. Therefore visualization of food in the cooking cavity is provided during cooking operations by energizing a selected radiant cooking lamp for a short period of time (i.e., 4 seconds) so that the cooking cavity is illuminated but negligible cooking is performed by the light energy output by the lamp. A limit on illuminations operations in a given time period (e.g., five operations in two minutes) prevents over-cooking of food from repeated operation of the illumination feature.

BRIEF DESCRIPTION OF THE DRAWINGS

FIG. 9 is a circuit schematic diagram of the oven shown in FIG. 1;

DETAILED DESCRIPTION OF THE INVENTION

The present invention is directed, in one aspect, to operation of an oven that includes at least two types of cooking elements, such as radiant and microwave cooking elements. Although one specific embodiment of radiant/microwave cooking oven is described below, it should be understood that the present invention can be utilized in combination with many other such ovens and is not limited to practice with the oven described herein. For example, the oven described below is an over the range type oven. The present invention, however, is not limited to practice with just over the range type ovens and can be used with many other types of ovens.

Figure 1:
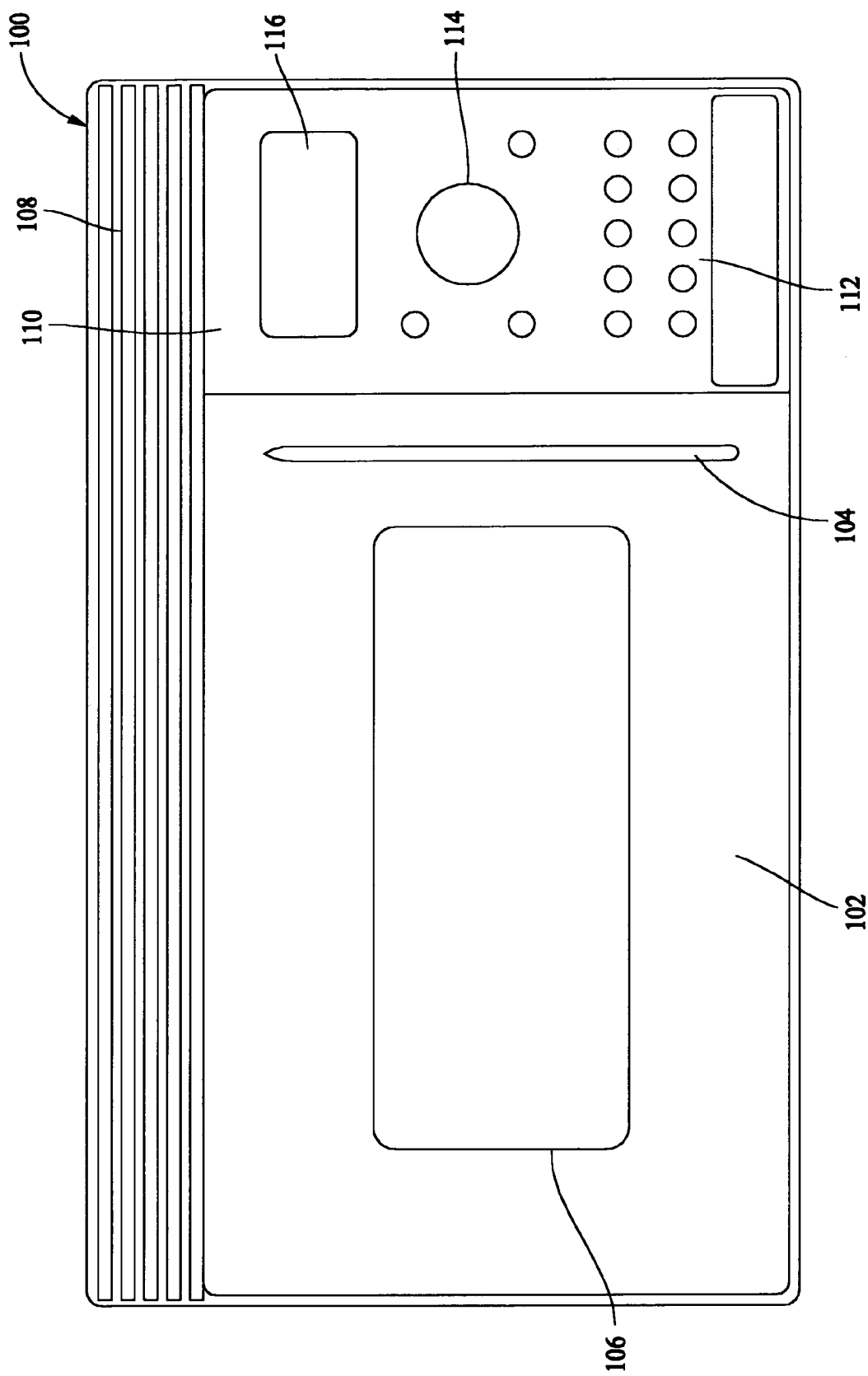
FIG. 1 is a front view of an oven in accordance with one embodiment of the present invention.

FIG. 1 is a front view of an over the range type oven 100 in accordance with one embodiment of the present invention. Oven 100 includes a frameless glass door 102 having an injection molded handle 104. A window 106 is provided for visualizing food in the oven cooking cavity. Door 102 has an inner metal frame that extends around the door periphery and comprises an RF door choke. The glass of door 102 has, for example, a thickness of about ⅛" and can withstand high temperatures, as is known in the art, and is secured to the inner metal frame by an adhesive. Handle 104 also is secured to the metal frame by bolts that extend through openings in the glass. Oven 100 also includes an extruded aluminum vent grille 108 and a frameless glass control panel 110.

Rubber tactile switch covers 112 are located over each key pad of panel 110, and an injection molded knob or dial 114 is provided for making multiple selections. Selections are made using dial 114 by rotating dial 114 clockwise or counter-clockwise and when the desired selection is displayed, pressing dial 114. The various selections available, in an exemplary embodiment, from dial 114 are set forth in Appendix A. Instructions and selections are displayed, for example, on a liquid crystal display 116.

The following functions can be selected from respective key pads of panel 110.

| | |
|---|---|
| CLEAR/OFF | Selecting this pad stops all cooking and erases the current program. |
| DELAYED START | Selecting this pad results in a delay in the start of cooking. |
| HELP | Selecting this pad enables an operator to find out more about the oven and its features. |
| MICROWAVE | Selecting this pad enables defrosting, heating beverages, reheating leftovers, popcorn, vegetables, and all types of microwave cooking. |
| MICROWAVE EXPRESS | Selecting this pad enables quick and easy warming of a sandwich, or reheat of coffee. |
| OPTIONS ON/OFF | Selecting this pad enables access to the auto night light, beeper volume control, clock, clock display, and display scroll speed features. |
| OVEN LIGHT | Selecting this pad during microwave cooking illuminates the cavity. |
| POWER LEVEL | Selecting this pad enables adjusting the power levels for speed cooking and microwave cooking. |
| REMINDER | Selecting this pad enables an operator to select a time at which an alarm is to sound. |
| REPEAT LAST | Selecting this pad facilitates cooking repetitive items such as cookies and appetizers. |
| SPEED COOK MANUAL | Selecting this pad enables an operator to manually enter speed cooking time and power levels. |
| START/PAUSE | Selecting this pad enables an operator to start or pause cooking. |
| SURFACE LIGHT | Selecting this pad turns ON/OFF the surface light for the cooktop. |
| TIMER ON/OFF | Selecting this pad controls a general purpose timer (e.g., minutes and seconds) |
| VENT FAN | Selecting this pad enables an operator to clear the cooktop area of smoke or steam. |

Figure 2:
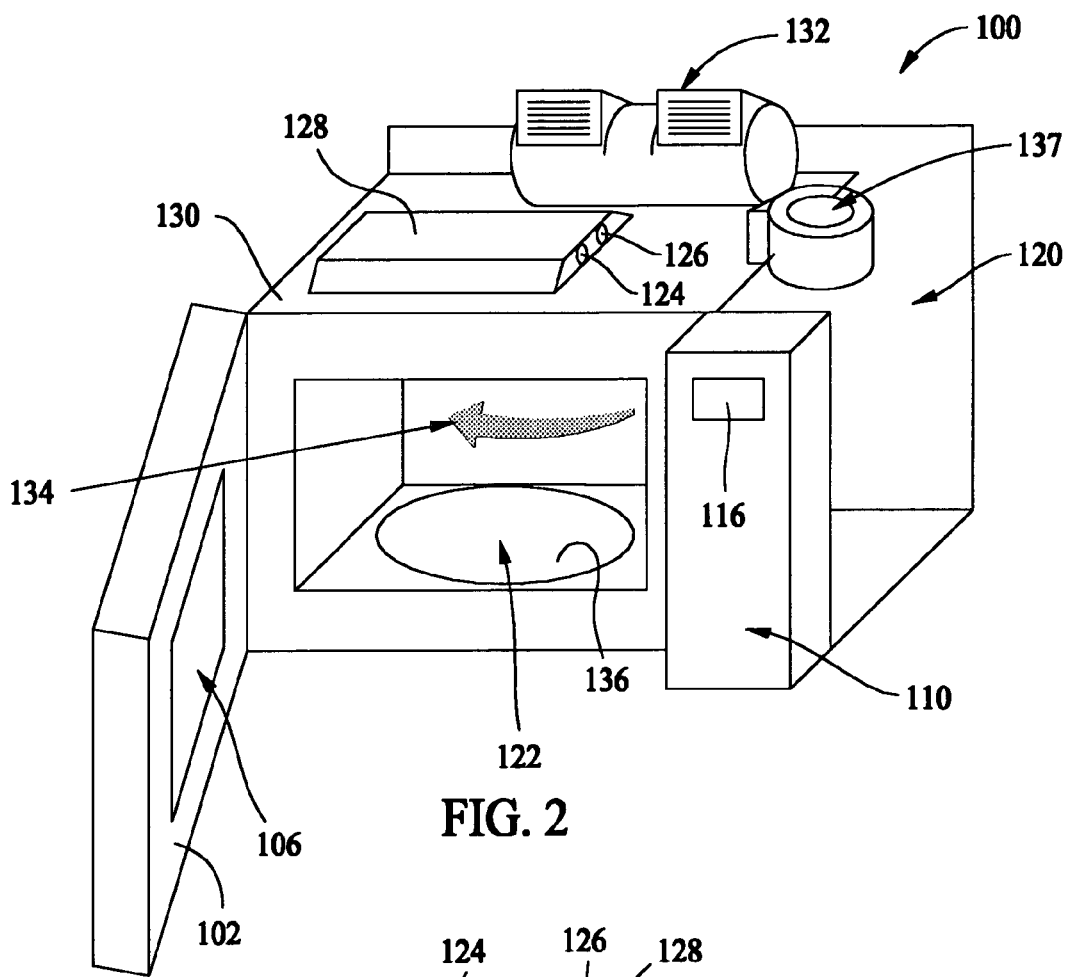
FIG. 2 is a perspective schematic view of a portion of the oven shown in FIG. 1.

FIG. 2 is a perspective schematic view of a portion of oven 100. Oven 100 includes a shell 120, and a cooking cavity 122 is located within shell 120. Cooking cavity 122 is constructed using high reflectivity (e.g., 72% reflectivity) stainless steel. Halogen lamps 124 and 126, and a reflective plate 128 are mounted to an upper panel 130 of shell 120. As described below in more detail, a halogen lamp also is located at a lower section of shell 120. An exhaust system 132 also is mounted to shell 120. Air flows through cavity 122 in a direction indicated by arrow 134. A cooling system 137 is mounted to shell 120 for cooling oven components. Exemplary dimensions of oven 100 are set forth below.

| | |
|---|---|
| Shell | |
| Exterior Height (front) | 15 11/16" |
| Exterior Height (rear) | 16 1/2" |
| Exterior Width | 29 1/8" |
| Exterior Depth | 14 1/8" |
| Cooking Cavity | |
| Cavity Height | 8 2/8" |
| Cavity Width | 19 2/7" |
| Cavity Depth | 13 3/8" |

Figure 3:
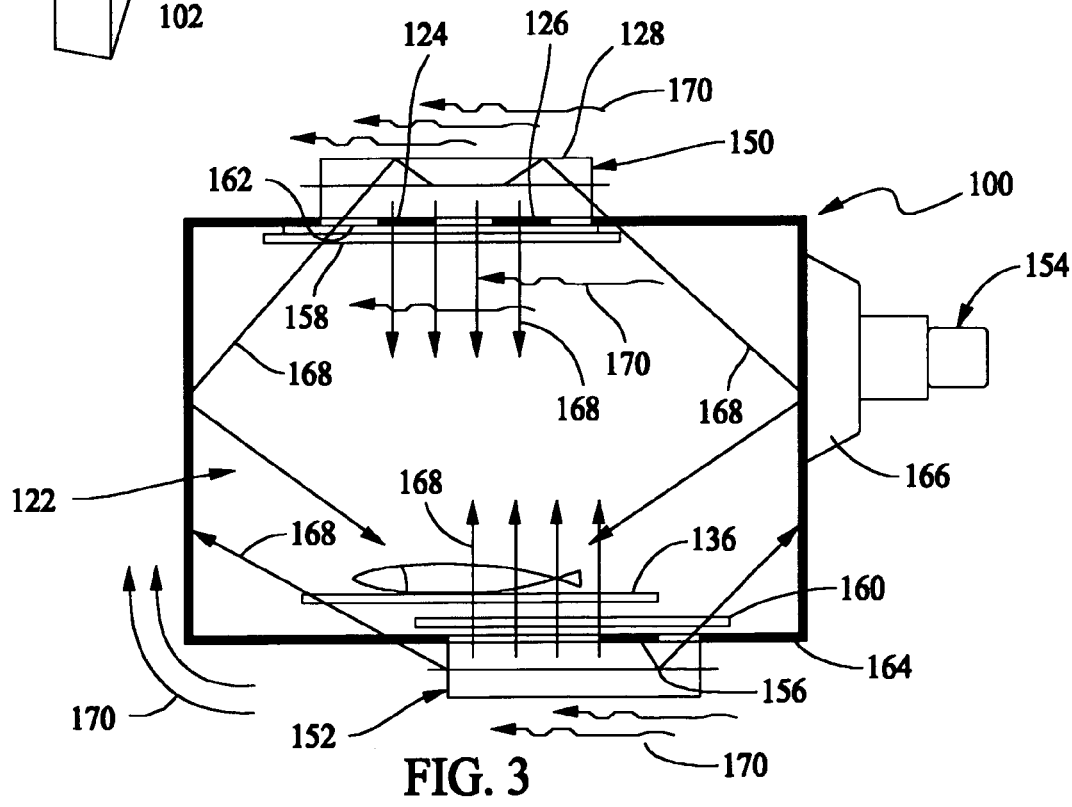
FIG. 3 is a schematic illustration of the radiant cooking unit and the microwave cooking unit relative to the cooking cavity.

FIG. 3 is a schematic illustration of oven 100, and particularly of halogen lamp cooking units 150 and 152 and microwave cooking unit 154 relative to cooking cavity 122. As shown in FIG. 3, upper cooking unit 150 includes two halogen lamps 124 and 126 and cooking unit 152 includes one halogen lamp 156. Lamps 124, 126, and 156, in an exemplary embodiment, are 1500 W halogen lamps having a color temperature of 2300 K, out power of 4.5 kW with 7% in the light wave range of 0.4 um to 0.7 um, 20% to 25% in the light wave range less than 1.0 um, and 36% in the light wave range of 0.4 um to 1.35 um. Lamp 124 is referred to as the upper center lamp, and lamp 126 is referred to as the upper exterior lamp. Lamp 156 is referred to as the lower lamp. Glass plates 158 and 160 extend over cooking units 150 and 152 between lamps 124, 126, and 156 and cavity 122. Also, twist mesh screens 162 and 164 having an opening ratio of 80% are provided for additional protection. Additional details are provided below with respect to reflector 128. A magnetron 166 of microwave cooking unit 154 is located on a side of cavity 122. Magnetron 166, in an exemplary embodiment, is rated at 1000 W and delivers 950 W into cavity 122.

Figure 4:
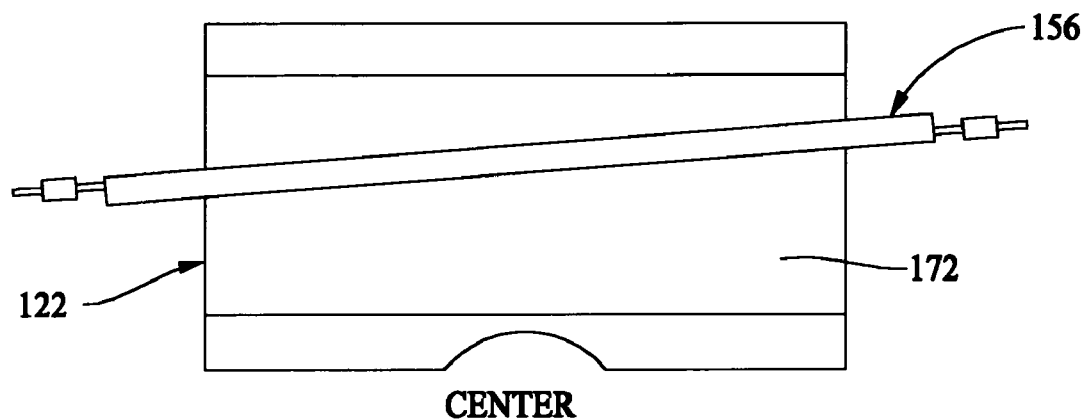
FIG. 4 is a schematic illustration of the lower lamp of the oven shown in FIG. 1.

With respect to lower lamp 156, and referring to FIG. 4, lamp 156 is located off center and at an angle relative to a bottom surface 172 of cavity 122. Such location of lower lamp 156 results, for example, in lowering the temperature of the rollers on turntable 136.

Figure 5:
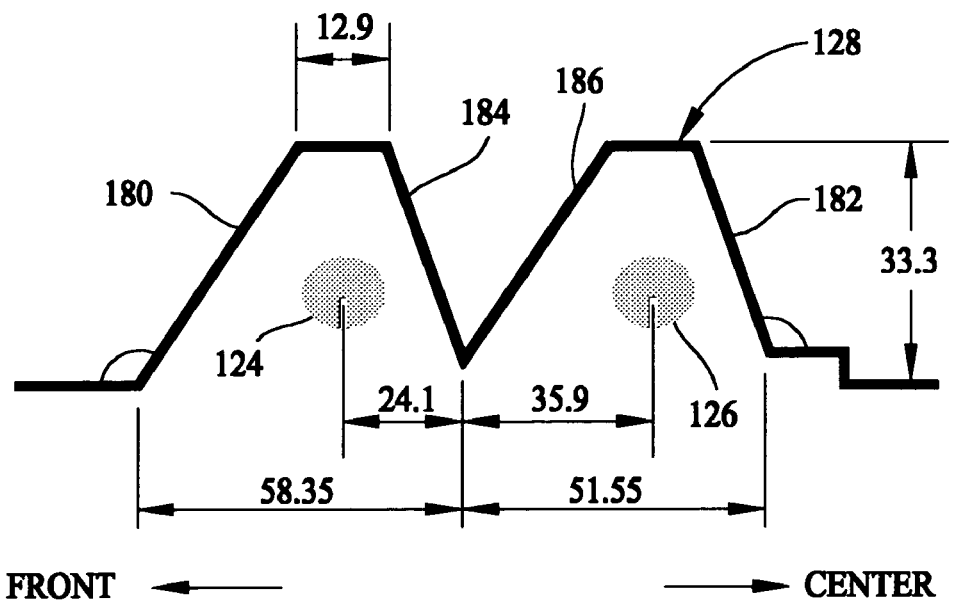
FIG. 5 is a schematic illustration of the reflector for the upper lamps of the oven shown in FIG. 1.

FIG. 5 is a schematic side illustration of reflector 128. Reflector 128 includes angular side sections 180 and 182 and angular center sections 184 and 186. The dimensions (in millimeters) indicated in FIG. 5 are exemplary and have been found suitable for at least one oven. By selecting the reflector dimensions as indicated in FIG. 5, upper lamps 124 and 126 are believed to provide more even cooking of items located on turntable 136.

Figure 6:
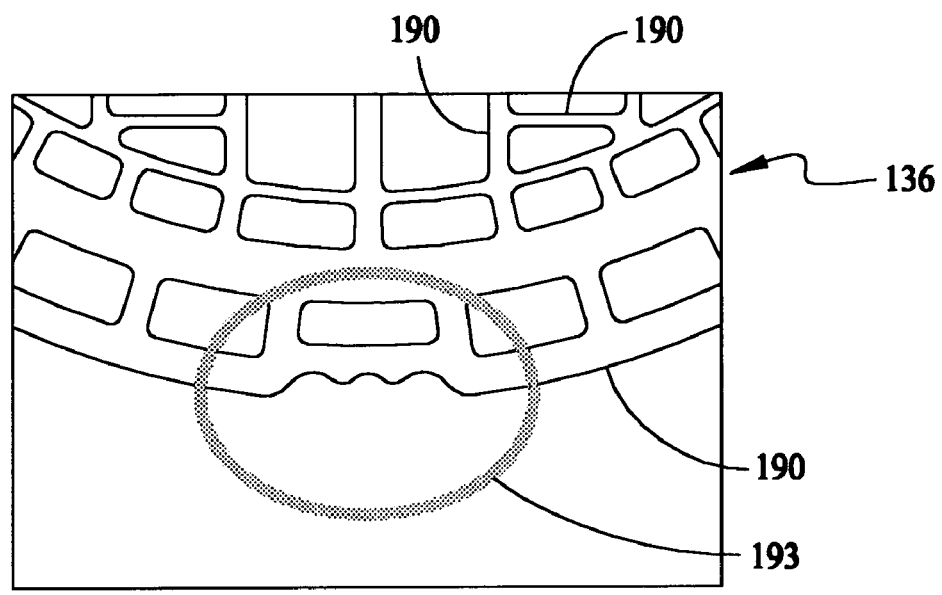
FIG. 6 is an illustration of a portion of the turntable of the oven shown in FIG. 1.

FIG. 6 illustrates a portion of turntable 136. Turntable 136 has an open grille construction with a 70% energy transmission. Turntable 136 rotates at about 6 r.p.m. and has a diameter of about 11 1/8". Turntable 136 includes metal segments 190 with ceramic rollers 192, one of which is illustrated within circle 194.

Figure 7:
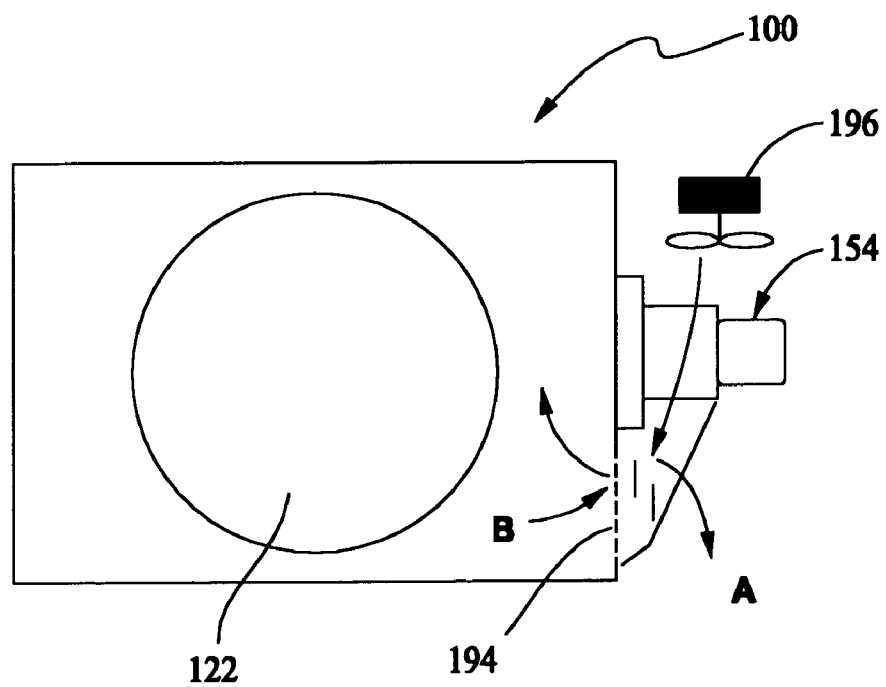
FIG. 7 is a schematic illustration of the cooking cavity of the oven shown in FIG. 1, including a damper to control air flow.

FIG. 7 illustrates a damper 194 located below microwave cooking unit 154. Damper 194 is open when in the microwave only mode to enable air to flow through cavity 122. In the speed cooking and radiant only mode, damper 194 closes to prevent air from flowing in a reverse direction and back towards microwave cooking unit 154.

Figure 8A:
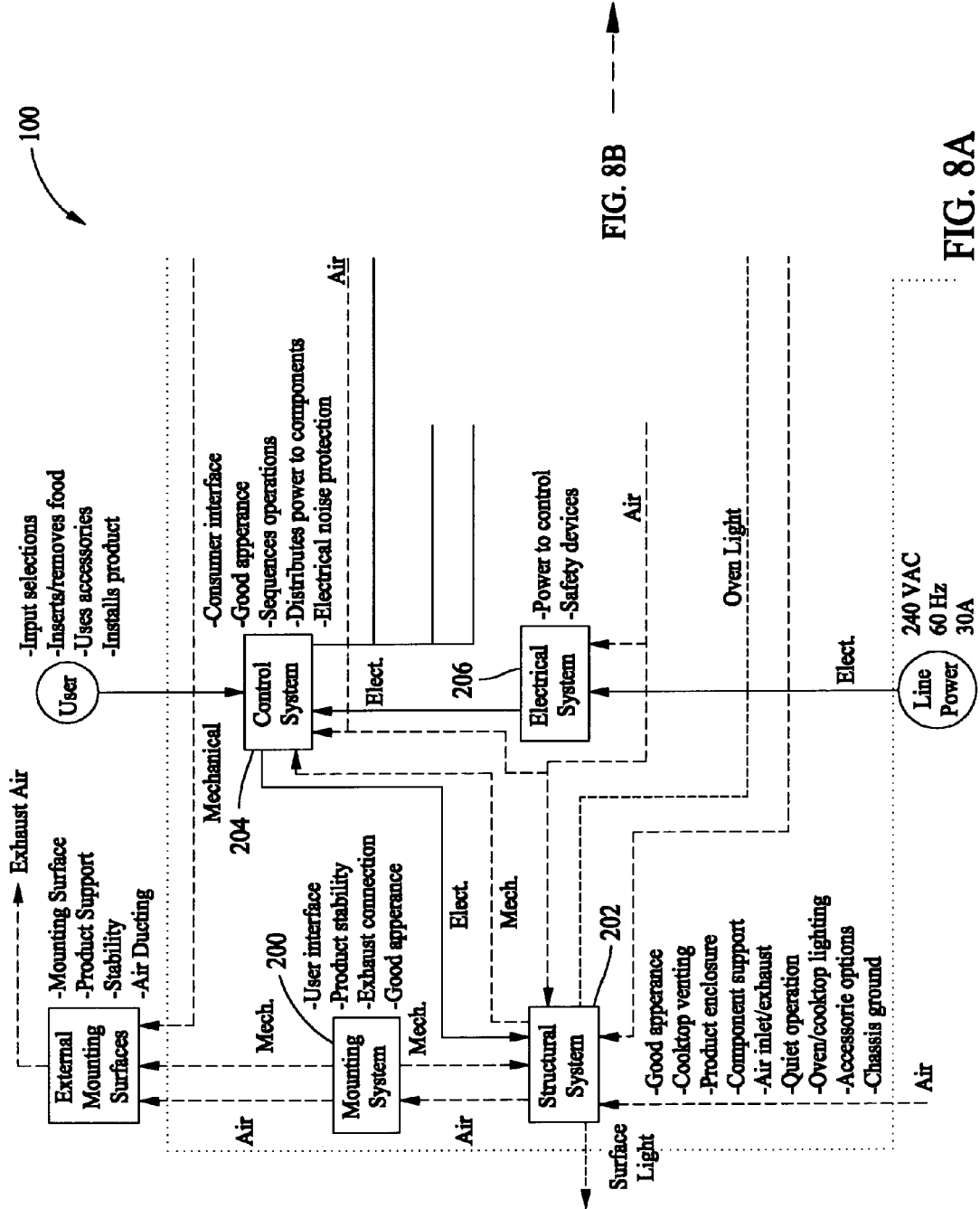
FIG. 8 is a functional block diagram of the oven shown in FIG. 1.
Figure 8B:
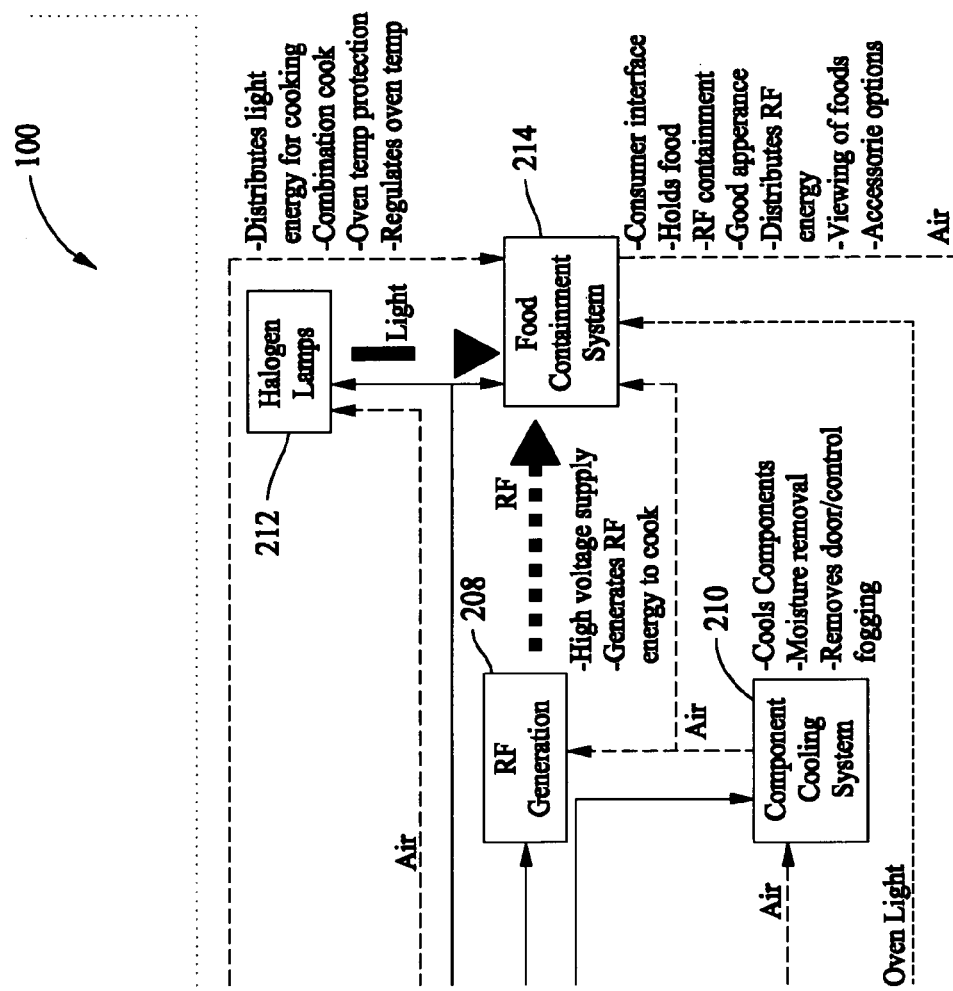

FIG. 8 is a functional block diagram of oven 100. As shown in FIG. 8, oven 100 includes a mounting system 200, a structural system 202, a control system 204, an electrical system 206, RF generation 208, a component cooling system 210, halogen lamps 212, and a food containment system 214. Various features of each system are indicated in FIG. 8. Mounting system 200 is provided to enable mounting oven over the range. Mounting system 200 also provides connection with an exhaust to enable removal of fumes from over the cooktop into the exhaust. Structural system 202 generally refers to shell 120, which provides an enclosure. Control system 204 includes an interface, i.e., keypads 112 and dial 114, and also distributes power to the other oven systems. Electrical system 206 powers the control and safety devices. RF generation 208 is performed by magnetron 166, and RF energy output by magnetron 166 is selectively used to cook food in food containment system. Component cooling system 210 is provided to cool the other system and to remove moisture from cavity 122. Halogen lamps 212 generate light energy used for cooking food in food containment system 214.

FIG. 9 is a schematic diagram of oven 100. Power is provided to oven 100 via lines L1, L2, and N. Relays R1–R13 are connected to a microcomputer which is programmed to control the opening and closing thereof. Lower lamp 156 is electrically connected to line L1 via a thermal cut off 300. Energization of lower lamp 156 is controlled by relays R1 and R2. A triac is in series with relay R1 to provide a soft start, as described below in more detail. Upper lamps 126 and 124 are connected to line L2 via thermal cut offs 304 and 306. Electronic switching devices 308 and 310 are in series with relay R4.

Relays R1 and R4 are air gap type relays, and are in series with electronic switching devices 302 and 308, respectively. Relays R1 and R4 are closed in the soft start operation of respective lamps 124, 126, and 156 to enable energization of electronic switching devices 302 and 308. After completion of the soft start, relays R1 and R4 are open. Relays R2, R3, and R6 are controlled by the micro computer to close after the soft start is completed to hold lamps 124, 126, and 156 on based on the particular power setting.

Oven 100 also includes an upper blower motor 312 and a lower blower motor 314 for cooling. A rectifier circuit 316 is provided for rectifying an AC input signal to a DC output signal to be supplied to a solenoid 317. Solenoid 317, when energized closes damper 194. A small synchronous motor may be used instead of rectifier circuit 316 and solenoid 317 to close damper 194. Thermal cut outs 318 and 320 and a fuse 322 also are provided to protect oven components, e.g., from overheating or an overcurrent condition. Cooktop lamps 324 are electrically connected in series with an electronic switching device 326 and are provided for illuminating the cooktop. Electronic switching devices 302, 308, 310, and 326 may be Triacs™.

A vent motor 328 having low, slow, and high speeds selectable via relays R7, R8, and R9 is provided for removing fumes from over the cooktop. An oven lamp 330, fan motor 332, and a turn table motor 334 are controlled by separate relays R10, R11, and R12. A primary interlock switch 336 is located in door 102 and prevents energization of cooking elements unless door 102 is closed. A relay R13 controls energization of microwave cooking unit 154. Microwave cooking unit 154 includes a high voltage transformer 338 which steps up the supply voltage from 120V to 2000V. A high voltage capacitor 340 and a high voltage diode 342 circuit steps up the voltage from transformer 338 from 2000V to 4000V. This high voltage is supplied to magnetron 166 and the output of magnetron 166 is supplied to a waveguide 344 which directs RF energy into cooking cavity 122. As also shown in FIG. 9, oven 100 includes a door sensing switch 346 for sensing whether door 102 is opened, a humidity sensor 348 for sensing the humidity in cooking cavity 122, a thermistor 350, and a base thermostat 352.

With respect to speed cooking operation of oven 100, the microcomputer controls relays R1–R6 and R13 based on the power level either associated with the preprogrammed cooking program or manually entered. In the speed cooking mode, for example, if a power level 9 is selected, the upper exterior lamp 124 has a target on-time of 29 seconds of a 32 second duty cycle, upper center lamp 126 has a target on-time of 25 seconds of a 32 second duty cycle, lower lamp 156 has a target on-time of 29 seconds of a 32 second duty cycle, and magnetron 16 has a target on-time of 29 seconds of a 32 second duty cycle. A duty cycle of 32 seconds is selected for one particular implementation. However, other duty cycles could be utilized. Set forth below is a chart which sets forth the target on-times based on power level.

| Power Level | Upper Exterior Lamp | Upper Center Lamp | Lower Lamp | Magnetron |
|---|---|---|---|---|
| 0 | 0 | 0 | 0 | 0 |
| 1 | 3 | 3 | 3 | 3 |
| 2 | 6 | 5 | 6 | 6 |
| 3 | 10 | 8 | 10 | 10 |
| 4 | 13 | 11 | 13 | 13 |
| 5 | 16 | 14 | 16 | 16 |
| 6 | 19 | 16 | 19 | 19 |
| 7 | 22 | 19 | 22 | 22 |
| 8 | 26 | 22 | 26 | 26 |
| 9 | 29 | 25 | 29 | 29 |
| 10 | 32 | 27 | 32 | 32 |

To increase lamp reliability, a soft start operation is used when energizing lamps 124, 126, and 156. Particularly, in accordance with the soft start operation, triacs 302, 308, and 310 are utilized to delay lamp turn-on. For example, upper exterior lamp 126 and lower lamp 156 are delayed for one second from commanded turn-on to actual turn-on. Upper center lamp 124 is delayed for two seconds from commanded turn-on to actual turn-on. Therefore, the target turn-on times are different from the commanded on-times. Set forth below is a table containing the commanded on-times based on power level selected.

| Power Level | Upper Exterior Lamp | Upper Center Lamp | Lower Lamp | Magnetron |
|---|---|---|---|---|
| 0 | 0 | 0 | 0 | 0 |
| 1 | 4 | 5 | 4 | 3 |
| 2 | 7 | 7 | 7 | 6 |
| 3 | 11 | 10 | 11 | 10 |
| 4 | 14 | 13 | 14 | 13 |
| 5 | 17 | 16 | 17 | 16 |
| 6 | 20 | 18 | 20 | 19 |
| 7 | 23 | 21 | 23 | 22 |
| 8 | 27 | 24 | 27 | 26 |
| 9 | 30 | 27 | 30 | 29 |
| 10 | 32 | 29 | 32 | 32 |

For example, if upper lamps 124 and 126 are to operate at power level 7, then upper lamp 124 would be commanded to operate for 21 seconds and upper exterior lamp 126 would be commanded to operate for 23 seconds. Lamps 124 and 126 would be commanded to turn-on for 21 and 23 seconds, respectively, at the beginning of each 32 second duty cycle. Due to the soft-start delays, lamps 124 and 126 would actually be on for 19 seconds (lamp 124) and 22 seconds (lamp 126) of each 32 second duty cycle.

Figure 10:
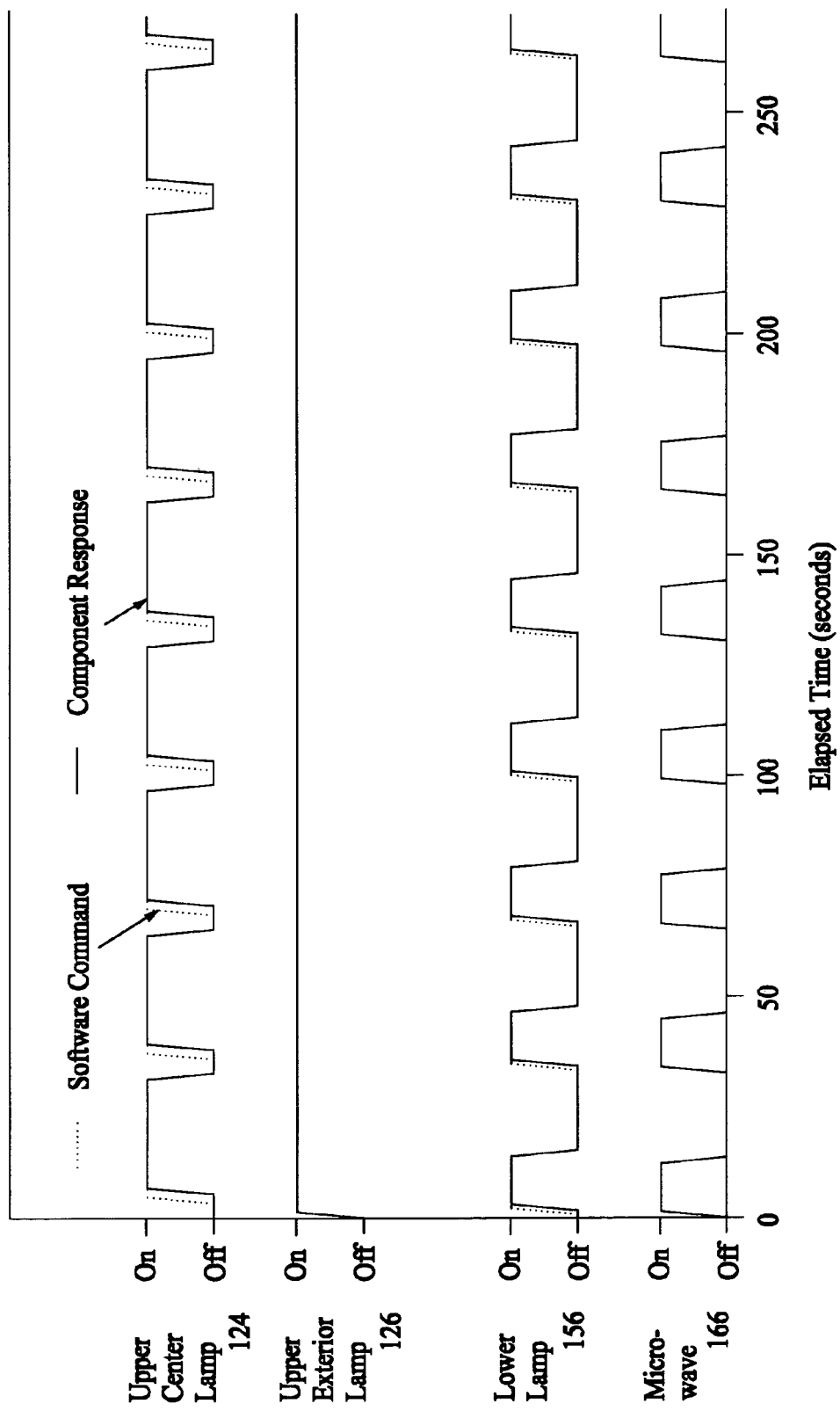
FIG. 10 is a timing diagram illustrating target and command times for energizing the cooking elements.

FIG. 10 is a timing diagram illustrating the state of lamps 124, 126, and 156, and magnetron 166. In the example, refrigerated crescent rolls are to be cooked in accordance with the following:

| | |
|---|---|
| Total Time: | 4:30 |
| Upper Power Level: | 10 |
| Lower Power Level: | 3 |
| Microwave Power Level: | 3 |

As shown in FIG. 10, upper center lamp 124 is commanded on (dashed line) two seconds before it actually turns on (solid line). Lamp 124 is on for 27 seconds of each 32 second period. Upper exterior lamp 126 is always on during this period. Lower Lamp 156 is on one second after it is commanded to turn on, and in on for 10 seconds out of each 32 second period. Magnetron 166 has no delay between command and execution of on time, and is on for 10 seconds of each 32 second period.

Figure 11:
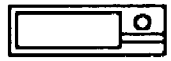
FIGS. 11–14 illustrate messages displayed when adjusting/entering the power level and cooking time.
Figure 12:
Figure 13:
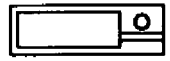
Figure 14:
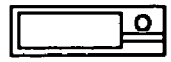

An operator may adjust the power level of the upper lamps, the lower lamp, and the microwave during operation. To change the power level, the operator selects the POWER LEVEL pad and a select icon flashes on display 116. A message "Select UPPER POWER" then is displayed as shown in FIG. 11. Rotation of dial 114 then enables an operator to select the upper power level (clockwise rotation increases the power level and counter clockwise rotation decreases the power level). When dial 114 is pressed to enter the selection, a short beep sounds and "Select LOWER POWER" is displayed as shown in FIG. 12. Dial rotation then alters the current lower power level, and when dial 114 is pressed, a short beep is sounded. Then, "Select MICRO POWER" is displayed as shown in FIG. 13. Dial rotation now alters the microwave power level. When dial 114 is pressed to enter the selection, a short beep is sounded and the OVEN icon flashes and the SELECT icon is turned off. "ADJUST TIME or START" is then displayed as shown in FIG. 14. The time may be adjusted or the START pad pressed.

Figure 15:
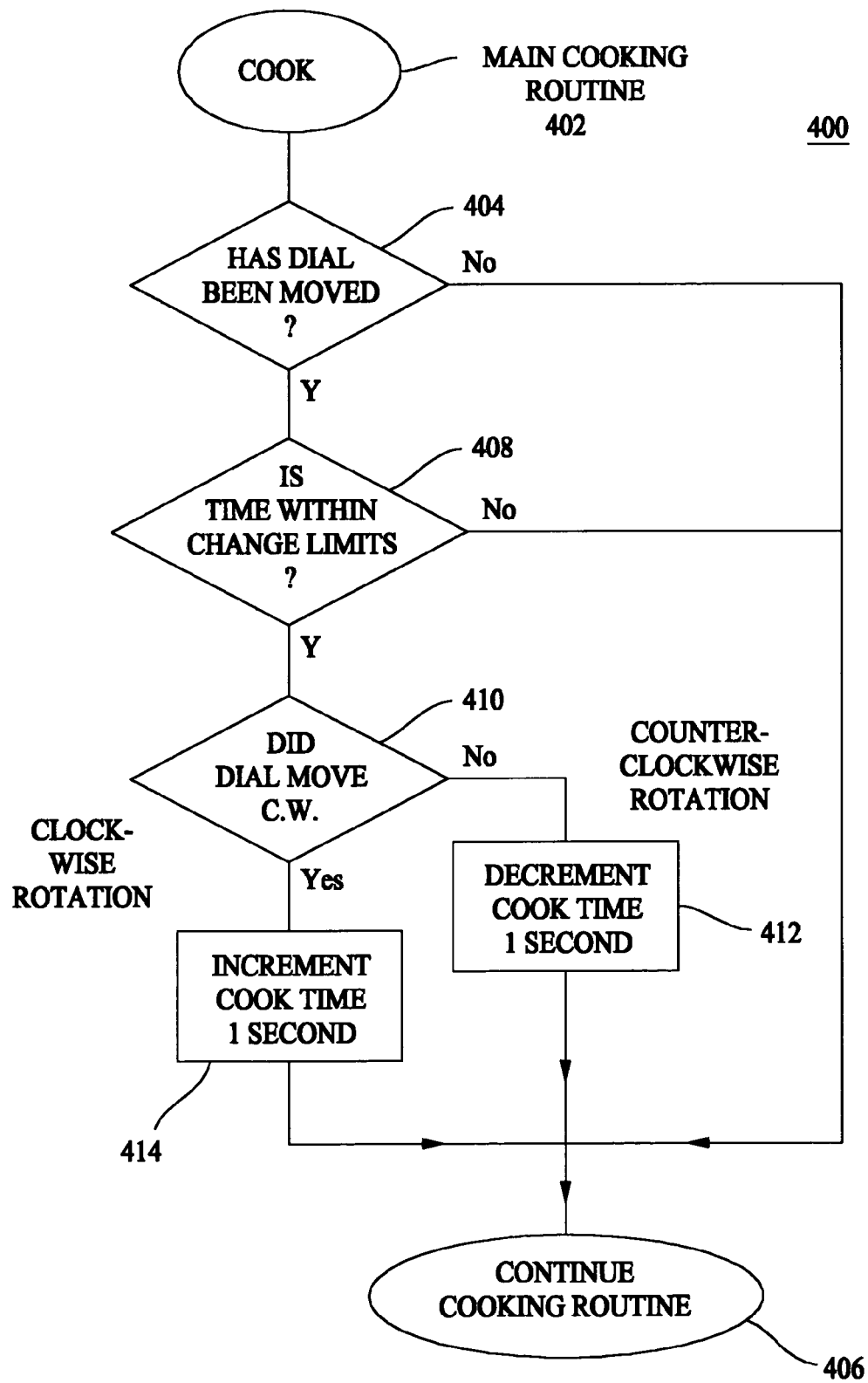
FIG. 15 is a flow chart illustrating process steps executed when adjusting the cook time.

When the power level pad is pressed at an acceptable time during lightwave cooking, i.e., one or more of the lamps are energized, the cooking countdown continues and the UPL (FIG. 11), LPL (FIG. 12) and MPL (FIG. 13) displays appear. The same operation as described above is utilized except that after entering the new microwave power level, 2 short beeps are sounded and the countdown and UPL, LPL and MPL display continue for 2.0 seconds. After 2.0 seconds, the UPL, LPL and MPL displays are removed and only the cooking countdown continues. If the power level pad is pressed when it is not allowed to change/enter or recall the power level, a beep signal (0.5 seconds at 1000 hz) sounds and the message "POWER LEVEL MAY NOT BE CHANGED AT THIS TIME" scrolls on display 114. After the scroll has completed, the previous foreground features return. If the power level pad is pressed at a time when a change/entry is allowed, but no dial rotation or entry occurs within 15 seconds, the UPL, LPL and MPL display are removed and the display returns to the cooking countdown FIG. 15 is a flow chart 400 illustrating process steps executed when adjusting the cook time during cooking operations. During cooking operations, a main cooking routine COOK is executed. If dial 114 is not moved 404, the main cooking routine continues to be executed 406. If dial 114 is moved, then the microcomputer determines whether a time change can be made, e.g., is the time remaining within the change limits 408. For example, if only 15 seconds remain in a cooking operation, no time change may be allowed to prevent an operator from shutting down a cooking operation by rotating dial 114 until zero is displayed, sometimes referred to as a "hard shutdown", which may not be desirable. If the remaining time is not within the change limits, then the main cooking routine continues to be executed 406. If the remaining time is within the change limits, then the micro computer determines whether dial 114 was moved clockwise 410. If no (i.e., dial 114 was moved counterclockwise), then for each increment that dial 114 is moved, the cook time is decremented by one second 412. If yes, then for each increment that dial 114 is moved, the cook time is incremented by one second 414.

Figure 16:
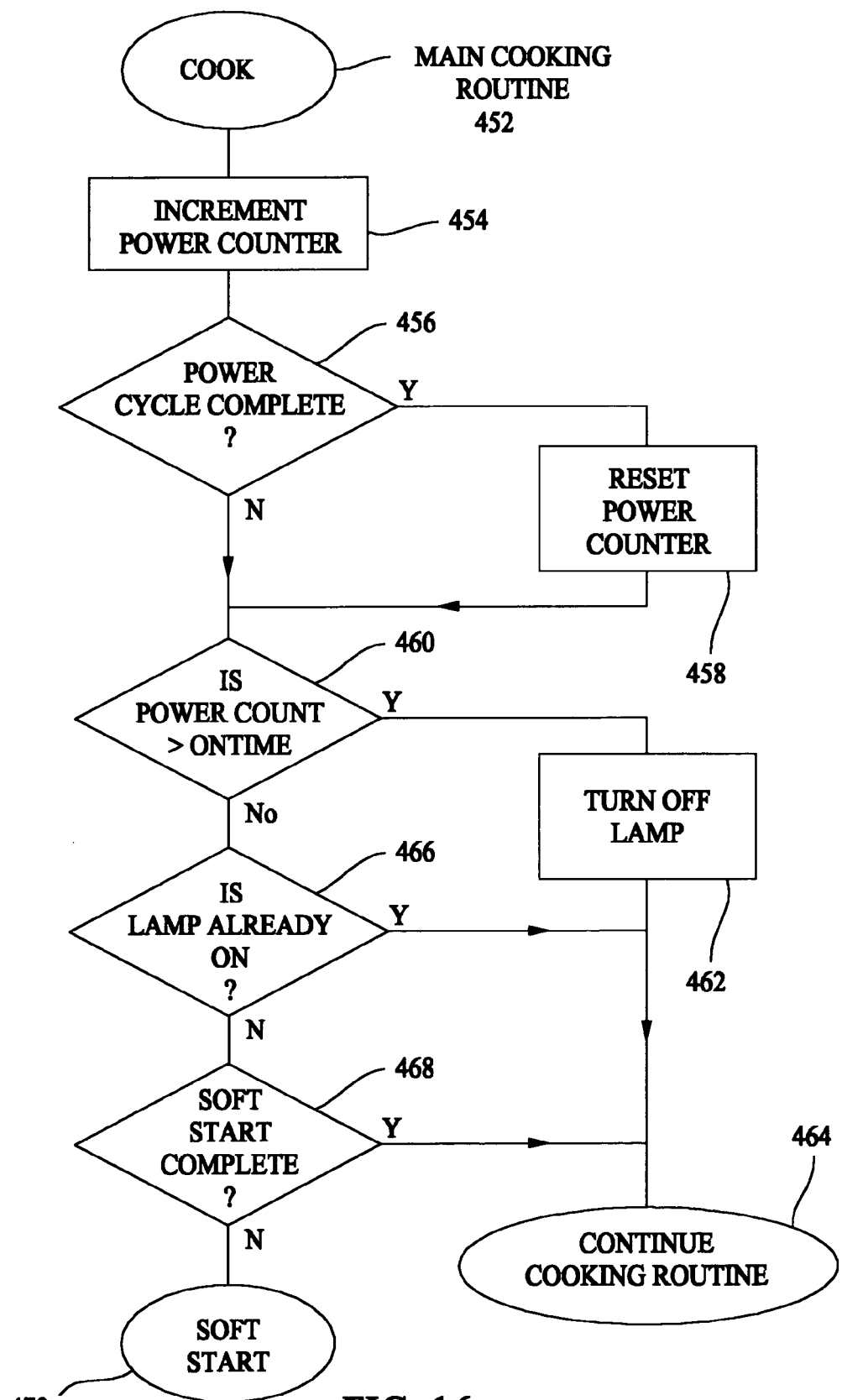
FIG. 16 is a flow chart illustrating process steps for lamp power level control.

FIG. 16 is a flow chart illustrating process steps 450 for lamp power level control. Such control is used to control energization of lamps 124, 126, and 156 (FIG. 9). More particularly, a main cooking routine 452 is executed during normal cooking operations. A power counter is incremented 454 for each one second interval, and the microcomputer then checks whether a power cycle is complete 456. For example, and as explained above, each duty cycle has a duration of 32 seconds. If the duty cycle is complete, then the power counter is reset 458. If the duty cycle is not complete, or after resetting the counter, then the micro computer checks whether the power count is greater than the "on time" 460. The "on time" is equal to the time corresponding to the selected power level for each lamp, as explained above. If the power count is greater than the "on time", then the particular lamp is de-energized 462 and cooking continues with the main cooking routine 464. If the power count is less than or equal to the "on time", then the micro computer checks whether the lamp is already on 466. If yes, then cooking operations continue 464. If no, then the micro computer checks whether the soft start has been completed 468. If the soft start has been completed, then operations continue with the cooking routine 464. If soft start operations are not complete, then the soft start routine is called 470.

Figure 17:
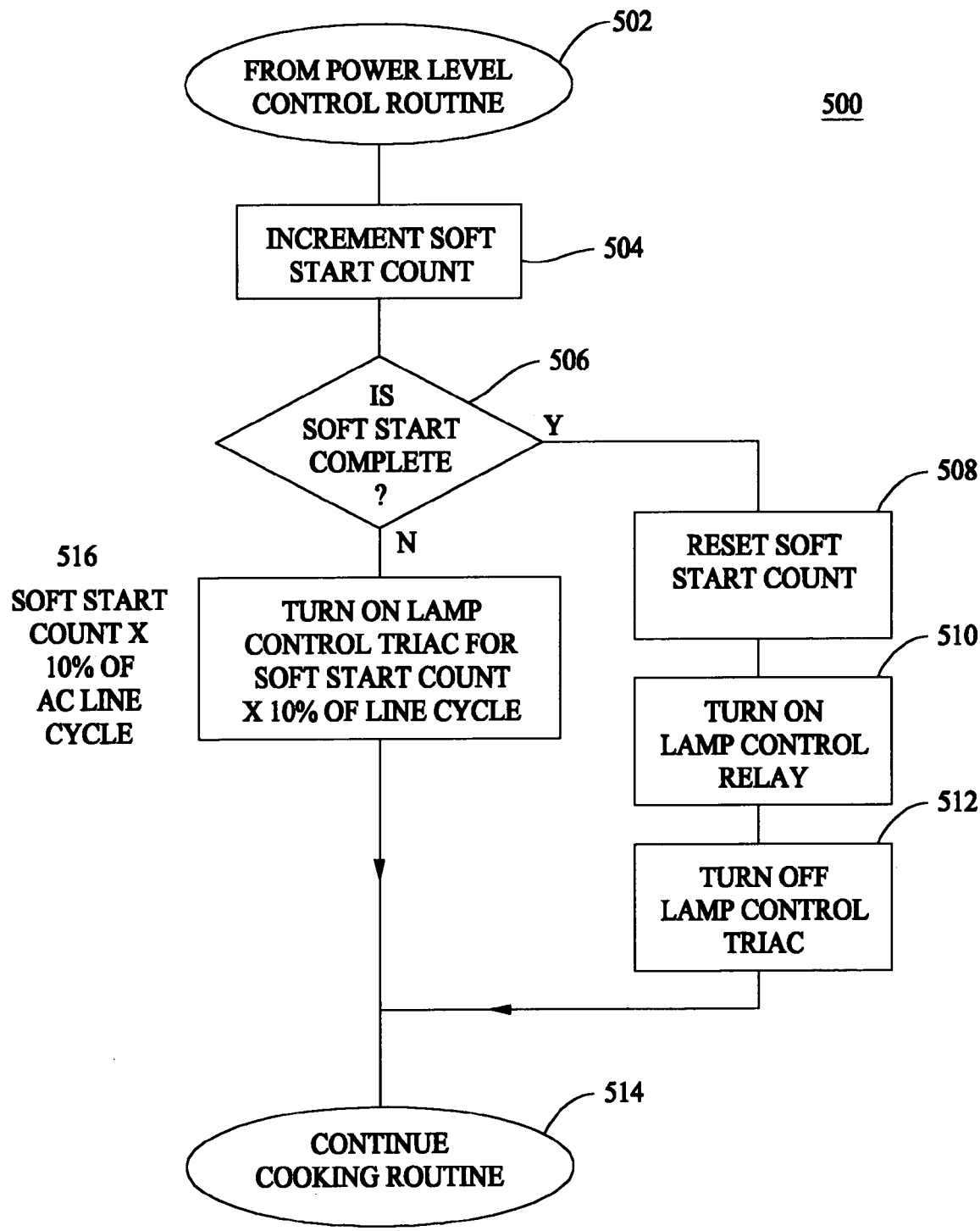
FIG. 17 is a flow chart illustrating process steps for the soft start of the Halogen lamps.

FIG. 17 is a flow chart illustrating process steps for the soft start routine 500. As explained above, the soft start for the halogen lamps is utilized to increase the lamp reliability. When routine 500 is called from the power level control routine 502, the micro computer then increments a soft start counter 504. The micro computer then determines whether the soft start is complete (e.g., depending on the lamp, the soft start has a duration of 1 or 2 seconds, as explained above). If soft start is complete, then the microcomputer resets the soft start counter 508, turns on the lamp control relay 510, and turns off the lamp control triac 512. Operations then proceed to the cooking routine 514. If soft start is not complete, then the micro computer turns on the lamp control triac for a soft start count ×10% of the line cycle 516. Operations then proceed to the cooking routine.

The glass of the oven door is fabricated using known methods, including but not limited to use of colored or tinted glass, to produce a shield to protect users from intense light generated by radiant lamps 124, 126 and 156, such as dark window 106 (shown in FIG. 1) Therefore, dark window does not enable visualization of food within cavity 122 unless a bright light, such as a Halogen lamp, is on and sufficiently energized to illuminate cavity 122. Therefore, in some cooking operations such as the microwave only mode of cooking or when radiant cooking at low power levels, and in order to visualize food in cooking cavity 122, an operator may select the OVEN LIGHT button on keypad 112. When this pad is selected during cooking, the microcomputer energizes upper center lamp 124 for four seconds at full power (i.e., power level 10), with a soft start, i.e., two seconds of soft start and two seconds of power level 10 energization for a total of four seconds, as described above. Lamp 124 illuminates the cooking cavity sufficiently so that an operator can visualize the food through window 106.

A duration of energization of upper center lamp 124 for cavity illumination purposes is limited, such as to the four seconds described, to briefly illuminate cooking cavity 122 without contributing undesirable cooking energy to the food that would detrimentally affect a cooking outcome, especially for foods specifically prepared and packaged for microwave cooking only. Further, the microcomputer is programmed to allow a limited number of cavity illumination operations in a given period of time, such as, for example, five operations in a two minute period, to avoid unintended and undesirable cumulative effects of repetitive illuminations operations. In one embodiment, after the designated limit of cooking operations has been reached, pressing the OVEN LIGHT button on keypad 112 does not illuminate oven cavity 122, and in a further embodiment, a message is displayed on display 116 to notify a user that the OVEN LIGHT feature is temporarily deactivated.

In various alternative embodiments, different time periods for cavity illuminations, and different numbers of allowable illuminating operations over varying time periods are employed. Also in various alternative embodiments, cooking lamps 126 or 156 are energized in lieu of, or in a sequence with, upper center lamp 124 to illuminate cooking cavity 122.

While the invention has been described in terms of various specific embodiments, those skilled in the art will recognize that the invention can be practiced with modification within the spirit and scope of the claims.

What is claimed is:

1. A speed cooking oven comprising:
   a cooking cavity;
   a microwave cooking unit for delivering microwave energy into said cooking cavity;
   a plurality of radiant lamps for delivering radiant energy into said cooking cavity;
   a control panel operatively connected to said microwave cooking unit and said plurality of radiant lamps for user manipulation of oven feature inputs including an OVENLIGHT input; and
   a microcomputer coupled to said control panel, said microcomputer programmed to operate said oven in a microwave only cooking mode, a radiant only cooking mode, and a dual cooking mode for a cooking time in accordance with a user input to said control panel, said microcomputer programmed to energize one of said plurality of radiant cooking lamps upon user actuation of said OVENLIGHT input for a predetermined time to illuminate said cooking cavity when said oven is operated in said microwave only mode.

2. A speed cooking oven in accordance with claim 1 wherein said predetermined time is about 4 seconds.

3. A speed cooking oven in accordance with claim 1 wherein said microcomputer is further programmed to execute a soft start algorithm when energizing said radiant lamp.

4. A speed cooking oven in accordance with claim 3 wherein said microcomputer is further programmed to limit a number of energizations of said one of said radiant cooking lamps during a predetermined time period.

5. A speed cooking oven in accordance with claim 4 wherein said number of energizations limit is five energizations.

6. A speed cooking oven in accordance with claim 4 wherein said predetermined time period to limit said number of energizations is approximately two minutes.

7. A speed cooking oven in accordance with claim 1 wherein said oven comprises an upper radiant cooking unit comprising at least one of said plurality of lamps radiant cooking lamp and a lower radiant cooking unit comprising at least one of said plurality of radiant lamps, said radiant upper cooking unit lamp energized to illuminate said cavity.

8. A speed cooking oven in accordance with claim 7 wherein said at least one of said plurality of radiant lamps of said upper cooking unit comprises an upper center lamp and an upper exterior lamp, said upper center lamp of said upper cooking unit energized by said microprocessor to illuminate said cooking cavity.

9. A speed cooking oven in accordance with claim 7 wherein said cooking cavity comprises a bottom surface, said at least one of said plurality of radiant lamps of said lower cooking unit mounted at an angle relative to said bottom surface.

10. A speed cooking oven in accordance with claim 1 wherein said radiant lamps comprise halogen lamps with about 20% to about 50% of out power in a light wave range less than 1.0 um.

11. A speed cooking oven in accordance with claim 1 wherein said radiant lamps are electrically coupled to electronic switching devices for soft start operation.

12. A method for illuminating a combination oven including a cooking cavity, a microwave cooking unit for delivering microwave energy to the cooking cavity, at least one radiant cooking lamp for delivering radiant energy to the cooking cavity, and a control panel operatively connected to the microwave cooking unit and the at least one radiant cooking lamp, the control panel including an OVEN LIGHT input switch, said method comprising the steps of:
   engergizing one of the radiant lamps with a soft start when the OVEN LIGHT input switch is actuated by a user, thereby illuminating the oven cavity;
   maintaining energization of the energized radiant lamp for a predetermined period of time; and
   de-energizing the energized radiant lamp when the predetermined time has elapsed.

13. A method in accordance with claim 12 wherein said step of maintaining energization comprises the step of maintaining energization for approximately four seconds.

14. A method in accordance with claim 12 wherein said step of energizing one of the radiant lamps comprises the step of delaying energization of said one of the radiant lamps using a triac element.

15. A method in accordance with claim 12 wherein said method further comprises the step of limiting a number of energizations of the energized radiant lamp during a predetermined time period.

16. A method in accordance with claim 15 wherein said step of limiting the number of energizations comprises the step of limiting the number of energization to five within an approximately two minutes period.

17. A method in accordance with claim 15 wherein said step of limiting the number of energizations comprises the step of limiting the number of energization during an approximately two minutes period.

18. A method in accordance with claim 12 wherein the control panel further comprises a display, said method further comprising the step of displaying a message on the display upon each actuation of the OVEN LIGHT switch.

19. A speed cooking oven comprising:
   a microcomputer;
   a shell comprising a cooking cavity;
   a radiant cooking unit comprising at least one radiant cooking lamp for delivering radiant energy into said cooking cavity, said radiant cooking unit operatively connected to said microcomputer;
   a microwave cooking unit for delivering microwave energy into said cooking cavity and operatively connected to said microcomputer;
   a control panel mounted to the shell and operatively connected to the microcomputer for user manipulation of an OVEN LIGHT switch;

a door mounted to the shell for closing said cooking cavity, said door comprising a tinted window to shield a user from intense light inside said cooking cavity during oven operation;

said microcomputer programmed to operate said oven in a microwave only cooking mode, a radiant only cooking mode, and a speed cooking mode for a cooking time in accordance with user input to said control panel; and said microcomputer programmed to energize said radiant cooking lamp upon user actuation of said OVEN LIGHT switch for a predetermined time when said oven is operated in said microwave only mode, thereby illuminating said cooking cavity and enabling visualization of food through said window.

20. A speed cooking oven in accordance with claim 19 wherein said microcomputer is further programmed to limit a number of energizations of said radiant cooking lamp for illumination purposes to a selected number of energizations over a predetermined period of time.

* * * * *